US008831211B2

(12) United States Patent
Dwelley et al.

(10) Patent No.: US 8,831,211 B2
(45) Date of Patent: Sep. 9, 2014

(54) COMMON-MODE DATA TRANSMISSION FOR POWER OVER ETHERNET SYSTEM (75) Inventors: David McLean Dwelley, Santa Barbara, CA (US); John Arthur Stineman, Jr., Carpinteria, CA (US)

(73) Assignee: Linear Technology Corporation, Milpitas, CA (US)

( * ) Notice: Subject to any disclaimer, the term of this patent is extended or adjusted under 35 U.S.C. 154(b) by 2890 days.

(21) Appl. No.: 10/991,387

(22) Filed: Nov. 19, 2004

(65) Prior Publication Data

US 2006/0109728 A1  May 25, 2006

(51) Int. Cl.
*H04M 1/00* (2006.01)
*H04L 12/12* (2006.01)
*G06F 1/26* (2006.01)
*H04L 12/10* (2006.01)

(52) U.S. Cl.
CPC ............... *G06F 1/266* (2013.01); *H04L 12/12* (2013.01); *H04L 12/10* (2013.01); *Y02B 60/34* (2013.01)
USPC ....................................... 379/413; 379/93.36

(58) Field of Classification Search
CPC ... H04M 11/06; H04M 11/002; H04M 9/001; H04M 1/723; H04M 9/00; H04M 19/001; H04M 19/08; H04M 19/005; H04L 12/12; H04Q 3/00; H04B 3/54; H04B 3/44
USPC ............ 379/93.36, 102.04, 106.04, 169, 176, 379/186, 307, 318, 322, 323, 324, 348, 379/395.01, 413
See application file for complete search history.

(56) References Cited

U.S. PATENT DOCUMENTS

| 6,373,326 | B1 | 4/2002 | Tomari |
| 6,535,983 | B1* | 3/2003 | McCormack et al. ......... 713/310 |
| 6,715,087 | B1* | 3/2004 | Vergnaud et al. ............ 713/300 |
| 6,937,454 | B2* | 8/2005 | Mikolajczak et al. ........ 361/111 |
| 7,042,690 | B2* | 5/2006 | Male ............................... 361/62 |
| 7,154,381 | B2* | 12/2006 | Lang et al. .................. 340/12.32 |
| 7,170,194 | B2* | 1/2007 | Korcharz et al. ............... 307/21 |
| 7,366,297 | B1* | 4/2008 | Marshall et al. ........ 379/413.03 |
| 2004/0042141 | A1* | 3/2004 | Mikolajczak et al. ........ 361/103 |
| 2004/0230846 | A1* | 11/2004 | Mancey et al. ............... 713/300 |
| 2004/0260794 | A1* | 12/2004 | Ferentz et al. ................ 709/220 |

(Continued)

FOREIGN PATENT DOCUMENTS

JP      2000-353392      12/2000

OTHER PUBLICATIONS

IEEE Computer Society, "802.3af Part 3: carrier Sense Multiple Access with Collision detection (CSMA/CD) Access and Physical Layer Amendment: Data Terminal Equipment (DTE) Power via Media Dependent Interface (MDI)", Jun. 18, 2003, pp. 1-121.

(Continued)

*Primary Examiner* — Akelaw Teshale
(74) *Attorney, Agent, or Firm* — McDermott Will & Emery LLP (57) ABSTRACT Circuitry and methodology for providing data transmission in a Power over Ethernet (PoE) system having a Power Sourcing Equipment (PSE) for providing power to a PoE link, and a Powered Device (PD) coupled to the PoE link for receiving the power from the PSE. The PSE and PD support data communication with each other in a common mode between two pairs of lines in an Ethernet twisted pair cable.

20 Claims, 4 Drawing Sheets

(56) References Cited

U.S. PATENT DOCUMENTS

| | | | |
|---|---|---|---|
| 2005/0132240 A1* | 6/2005 | Stineman et al. | 713/300 |
| 2005/0136989 A1* | 6/2005 | Dove | 455/572 |
| 2005/0268120 A1* | 12/2005 | Schindler et al. | 713/300 |
| 2006/0078093 A1* | 4/2006 | Karam et al. | 379/24 |
| 2006/0082220 A1* | 4/2006 | Karam et al. | 307/4 |
| 2006/0089230 A1* | 4/2006 | Biederman et al. | 477/34 |
| 2006/0100799 A1* | 5/2006 | Karam | 702/57 |
| 2006/0115007 A1* | 6/2006 | Karam et al. | 375/257 |

OTHER PUBLICATIONS

Galit Mendelson, "All You Need to Know About Power Over Ethernet (PoE) and the IEEE 802.3af Standard", Jun. 2004, pp. 1-24.

Japanese Office Action issued in Japanese Patent Application No. JP 2007-543057, dated Aug. 18, 2009.

* cited by examiner

COMMON-MODE DATA TRANSMISSION FOR POWER OVER ETHERNET SYSTEM

TECHNICAL FIELD

This disclosure relates to power supply systems, and more particularly, to a circuitry and methodology for providing data transmission in a Power over Ethernet (PoE) system in a common mode.

BACKGROUND ART

Over the years, Ethernet has become the most commonly used method for local area networking. The IEEE 802.3 group, the originator of the Ethernet standard, has developed an extension to the standard, known as IEEE 802.3af, that defines supplying power over Ethernet cabling. The IEEE 802.3af standard defines a Power over Ethernet (PoE) system that involves delivering power over unshielded twisted-pair wiring from Power Sourcing Equipment (PSE) to a Powered Device (PD) located at opposite sides of a link. Traditionally, network devices such as IP phones, wireless LAN access points, personal computers and Web cameras, have required two connections: one to a LAN and another to a power supply system. The PoE system eliminates the need for additional outlets and wiring to supply power to network devices. Instead, power is supplied over Ethernet cabling used for data transmission.

As defined in the IEEE 802.3af standard, PSE and PD are non-data entities allowing network devices to supply and draw power using the same generic cabling as is used for data transmission. A PSE is the equipment electrically specified at the point of the physical connection to the cabling, that provides the power to a link. A PSE is typically associated with an Ethernet switch, router, hub or other network switching equipment or midspan device. A PD is a device that is either drawing power or requesting power. PDs may be associated with such devices as digital IP telephones, wireless network access points, PDA or notebook computer docking stations, cell phone chargers and HVAC thermostats.

PSE's main functions are to search the link for a PD requesting power, optionally classify the PD, supply power to the link if a PD is detected, monitor the power on the link, and disconnect power when it is no longer requested or required. A PD participates in the PD detection procedure by presenting a valid or non-valid detection signature to request power and indicate that power has been received. The PD detection signature has electrical characteristics measured by the PSE.

Electrical signals can be carried over cables in a normal, differential or common mode. A normal-mode signal appears between a pair of wires or on a single wire referenced to (or returned via) the earth, chassis or shield. Normal-mode signals are read between two wires in a balanced or unbalanced transmission path. A differential-mode signal appears differentially on a pair of wires in an ungrounded cable configuration. A common-mode signal appears equally with respect to local common or ground on both lines of a 2-wire transmission system.

Traditional data transmission over Ethernet is carried out between the Ethernet twisted pairs in a differential mode, where one pair is used for transmitting data from a first node to a second node, and the other pair is used for receiving data sent from the second node to the first node. In a PoE system, power between a PSE and a PD is transmitted in a common mode as a voltage between two of the Ethernet twisted pairs, typically by powering the center-taps of the isolation transformers used to couple the Ethernet data signals to the wire.

Since Ethernet data are sent differentially, the power transmitted in a common mode between the Ethernet transmit pairs and receive pairs does not affect the Ethernet data transmitted in a differential mode. A PD detection and powering protocol in a PoE system involves an analog scheme to sense impedance or current on the common-mode connection of the Ethernet twisted pairs.

Although PSE and PD are non-data entities, which are not involved in transmission of Ethernet data, it would be desirable in some cases to provide data transmission between the PSE and the PD, for example, for identification purposes.

SUMMARY OF THE DISCLOSURE

The present disclosure offers novel circuitry and methodology for providing data transmission in a Power over Ethernet (PoE) system comprising a Power Sourcing Equipment (PSE) for providing power to a PoE link, and a Powered Device (PD) coupled to the PoE link for receiving the power from the PSE. The PSE and PD are configured for supporting data communication with each other in a common mode between two pairs of lines in an Ethernet twisted pair cable.

In accordance with an embodiment of the disclosure, the PD may comprise a variable load for drawing from the PSE a first value of load current in a first operating mode and a second value of load current in a second operating mode. The first and second values of load current correspond to respective logic levels of a data signal to be transmitted to the PSE.

The PD may further comprise a voltage detector for detecting first and second voltage levels corresponding to respective logic levels of a data signal transmitted from the PSE. The voltage detector may include a comparator for comparing a voltage level of a signal received from the PSE with a reference voltage to detect a logic level of the data signal transmitted from the PSE.

The PSE may comprise a voltage generator for producing first and second voltage levels corresponding to respective logic levels of a data signal to be transmitted to the PD, and a current detector for detecting a value of the load current drawn by the PD.

The current detector may include a current to voltage converter for producing a voltage representing the value of current detected by the current detector, and a comparator for comparing the produced voltage with a reference voltage to determine a logic level of a data signal transmitted from the PD.

In accordance with one aspect of the disclosure, a protocol for data communication between a PD and a PSE in a PoE system involves:
  after receiving power from the PSE, initiation of data transmission by the PD, and
  acknowledgement by the PSE receipt of a data signal from the PD.

For example, the data transmission may be initiated during a low-current period defined by the IEEE 802.3af Standard. Duration of the data signal transmitted by the PD may be limited by a 250 ms window defined by the IEEE 802.3af Standard.

The PD may initiate data communication with the PSE to identify itself. For example, the PD may transmit to the PSE data to determine whether the PSE is capable of providing power higher than an amount of power required by the IEEE 802.3af Standard. The PSE may respond by transmitting data confirming ability to provide a higher amount of power In accordance with a further aspect of the disclosure, a PD interface device is provided for enabling a PD to support data communication with a PSE in a PoE system. The PD interface device may comprise a variable load for transmitting data having logic levels defined by values of PD operating current drawn from the PSE, and a voltage detector for detecting line voltage levels corresponding to logic levels of data transmitted by the PSE.

In accordance with another aspect, a PSE device is provided with ability to support data communication with a PD in a PoE system. The PSE device may comprise a current detector for detecting first and second values of current drawn by the PD, and a voltage generator for producing first and second line voltage levels corresponding to respective logic levels of a data signal to be transmitted to the PD.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made with the example of data transmission between PSE and PD in an IEEE 802.3af-compliant PoE system. It will become apparent, however, that the concepts described herein are applicable to data communications in any system for supplying power over a network.

Figure 1:
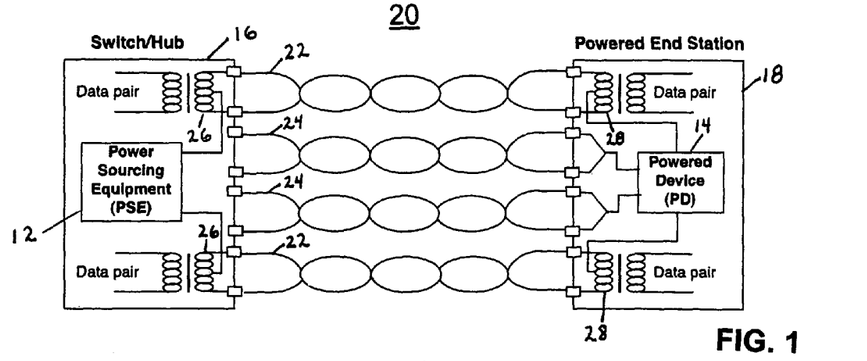
FIGS. 1-3 illustrate PoE arrangements, in which a data transmission system of the present invention may be implemented.

FIG. 1 illustrates a PoE system, in which the data transmission scheme of the present disclosure may be implemented. The PoE system includes a PSE 12 and a PD 14. The PSE 12 may be associated with a switch or hub 16, whereas the PD 14 is associated with a powered end station 18 coupled via Ethernet cabling 20 to the switch/hub 16. The Ethernet cabling 20 includes four twisted pairs of wire. However, 10Base-T and 100Base-TX Ethernet systems use only two of the twisted pairs for transmission of Ethernet data in a differential mode. These twisted pairs are referred to as data pairs 22. Two twisted pairs, which are referred to as spare pairs 24, remain unused. One of the data pairs 22 provides transmission of Ethernet data from the switch/hub 16 to the end station 18, whereas the other data pair 22 is used for receiving Ethernet data sent from the end station 18 to the switch/hub 16. A 1000Base-T Ethernet system uses all 4 twisted pairs for Ethernet data communications in a differential mode.

The PSE 12 provides a nominal 48V DC between the data pairs 22. The power provided from the PSE 12 to the PD 14 is applied in a common mode between two data pairs 22 by powering the center-taps of isolation transformers 26 used to couple the differential Ethernet data signals to the data pairs 22 at the switch/hub side. The PD 14 receives the power from the center-taps of isolation transformers 28 used to couple the differential Ethernet data signals to the data pairs 22 at the end station side.

Figure 2:
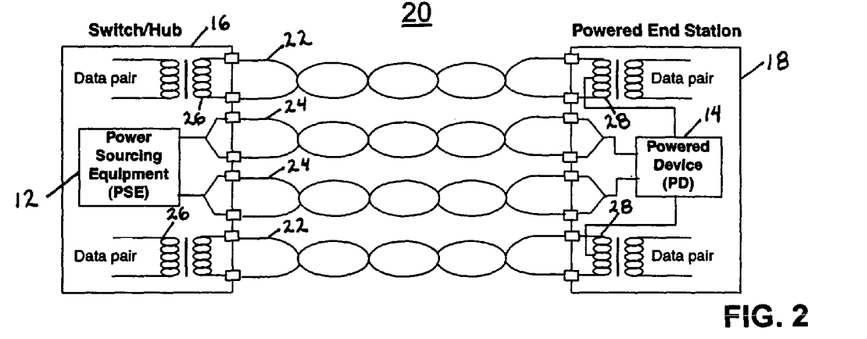

FIG. 2 illustrates another example of a PoE system in which the data transmission scheme of the present disclosure may be implemented. In this example, the power provided from the PSE 12 to the PD 14 is applied in a common mode as a voltage between two spare pairs 24. The data pairs 22 are used for transmitting and receiving Ethernet data in a differential mode between the switch/hub 16 and the powered end station 18.

The examples shown in FIGS. 1 and 2 illustrate endpoint PSE arrangements, where a PSE is coincident with a Data Terminal Equipment (DTE) or a repeater. Endpoint PSEs in the arrangements shown in FIGS. 1 and 2 may be compatible with 10Base-T, 100Base-TX and 1000Base-T Ethernet systems.

Figure 3:
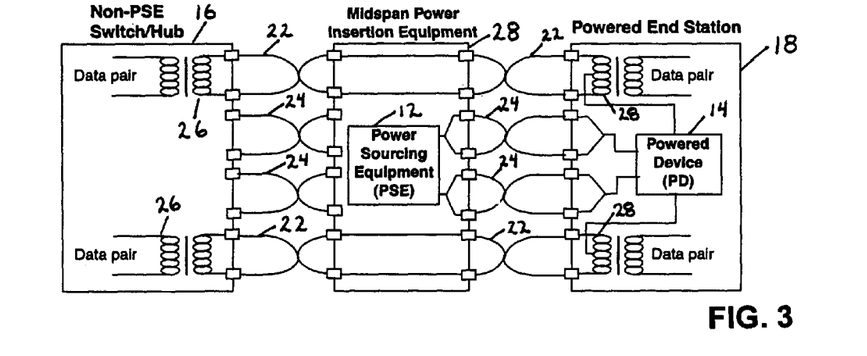

FIG. 3 illustrates a further example of a PoE system in which the data transmission scheme of the present invention may be implemented. This example shows a midspan PSE arrangement, where a PSE is located within a link segment distinctly separate from and between the Media Dependent Interfaces (MDIs). Midspan PSEs can be compatible with 10Base-T and 100Base-TX Ethernet arrangements.

In the PoE system shown in FIG. 3, the PSE 12 is provided in the midspan power insertion equipment 28 inserted into Ethernet cabling between the switch/hub 16 and the powered end station 18. The PSE 12 provides power to the PD 14 in a common mode by applying voltage between two spare pairs 24. The data pairs 22 are used for differential-mode Ethernet data communications between the switch/hub 16 and the powered end station 18.

As defined in the IEEE 802.3af standard, the PSE 12 and PD 14 participate in the PD detection procedure, during which the PSE 12 probes a link to detect a PD. If the PD is detected, the PSE 12 checks the PD detection signature to determine whether it is valid or non-valid. The valid and non-valid detection signatures are defined in the IEEE 802.3af standard. While the valid PD detection signature indicates that the PD is in a state where it will accept power, the non-valid PD detection signature indicates that the PD is in a state where it will not accept power.

If the signature is valid, the PD has an option of presenting a classification signature to the PSE to indicate how much power it will draw when powered up. A PD may be classified as class 0 to class 4. A PD of class 1 requires that the PSE supplies at least 4.0 W, a PD of class 2 requires that the PSE supplies at least 7.0 W, and a PD of class 0, 3 or 4 requires at least 15.4 W.

Based on the determined class of the PD, the PSE applies the required power to the PD. When the PD has completed detection procedure and received power, it is required by the IEEE 802.3af protocol to draw a minimum current of 10 mA for at least 75 ms, followed by an optional low-current period of up to 250 ms. The low-current period allows the PD to conserve power. Therefore, the PSE waits at least 250 ms before recognizing the minimum current condition of the PD.

In accordance with the present disclosure, this 250 ms window is utilized for providing common-mode data transmission between the PSE 12 and the PD 14. The common-mode data transmission involves an information exchange between the PSE 12 and PD 14 over the common-mode path used for power transmission in a PoE system.

Hence, in the PoE arrangement shown in FIG. 1, the data transmission between the PSE 12 and PD 14 may be carried out in a common mode over two twisted data pairs 22. In the PoE arrangements shown in FIGS. 2 and 3, the data transmission between the PSE 12 and PD 14 may be performed in a common mode over two twisted spare pairs 24. The common-mode data transmission of the present invention does not interfere with transmission of Ethernet data performed in a differential mode, and does not affect the 802.3 af power signaling protocols.

Figure 4:
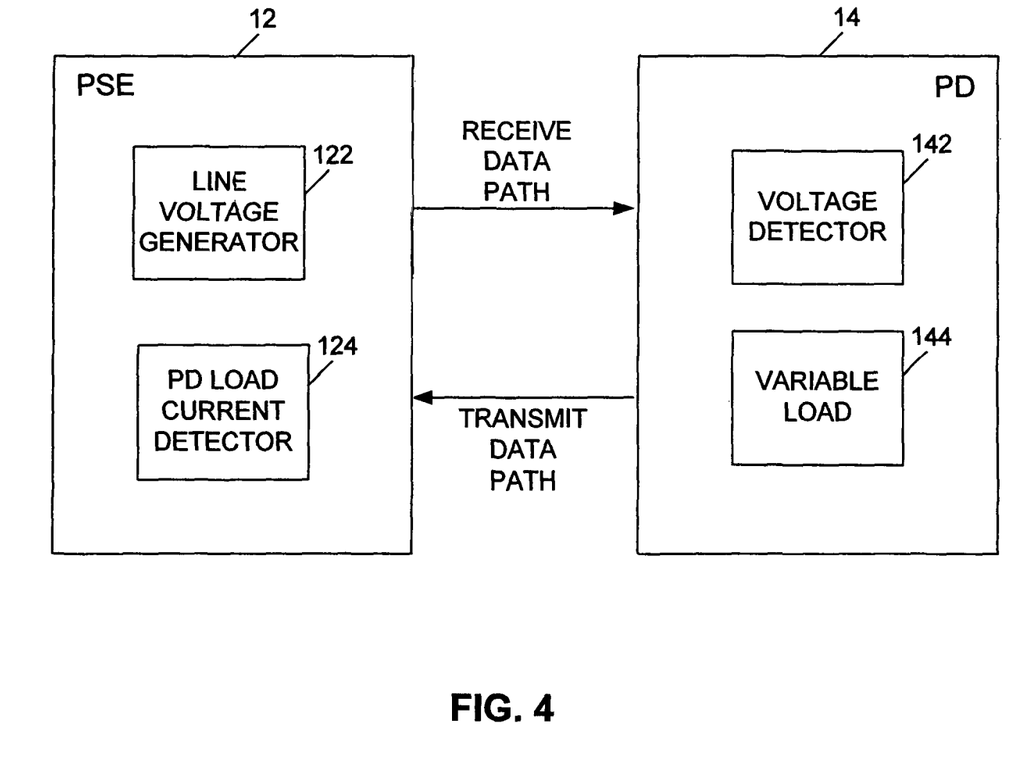
FIG. 4 illustrates the data communication system of the present invention.

As shown in FIG. 4, a common-mode data transmission system of the present invention includes a line voltage generator 122 and a PD load detector 124 associated with the PSE 12, and a voltage detector 142 and a variable load 144 associated with the PD 14. The line voltage generator 122 enables the PSE 12 to produce two distinctive values of a line voltage representing first and second logic levels of data to be transmitted to the PD 14. In the PoE arrangement shown in FIG. 1, the line voltage is applied between the center-taps of the isolation transformers 26 used to couple the differential Ethernet data signals to the data pairs 22 at the switch/hub side. On the PD side, the voltage detector 142 determines the line voltage provided between the center-taps of the isolation transformers 28 to detect the respective logic levels of the data received from the PSE 12. In the PoE arrangements shown in FIGS. 2 and 3, the line voltage produced by the line voltage generator 122 is applied in a common mode between the spare pairs 24 at the PSE side, and is detected by the voltage detector 142 between the spare pairs 24 at the PD side.

The variable load 144 enables the PD 14 to draw from the PSE 12 two distinct values of a load current representing first and second logic levels of data to be transmitted to the PSE 12. The PD load detector 124 allows the PSE 12 to measure the PD load current in order to detect the respective logic levels of the data received from the PD 14. In the PoE arrangement shown in FIG. 1, a path for the PD load current is provided in a common mode between the data pairs 22, whereas in the PoE arrangements shown in FIGS. 2 and 3, the PD load current path is provided in a common mode between the spare pairs 24.

In accordance with a common-mode data transmission protocol of the present disclosure, an information exchange may be initiated by the PD 14 that transmits desired information to the PSE 12. For example, the PD 14 that has just received power may transmit a 64-bit serial number to the PSE 12 to identify itself. To provide the data transmission, the PD 12 may modulate its load current above and below a threshold level.

For instance, as discussed above, the PD 14 is required by the IEEE 802.3af protocol to draw a minimum current of 10 mA for at least 75 ms, followed by a low-current period of up to 250 ms. Therefore, the PD 14 may draw a load current greater than 10 mA for 75 ms to satisfy the IEEE 802.3af requirement, and then alternately draw a load current either greater than 10 mA or less than 10 mA in a pattern that corresponds to the digital data to be transmitted to the PSE 12. For example, a load current greater than 10 mA may correspond to a logic "1" and a load current less than 5 mA may correspond to a logic "0".

By modulating its quiescent current above and below the 10 mA threshold level during the 250 ms low-current window, the PD 14 may transmit a serial data stream to the PSE 12. The number of bits transmitted in the 250 ms window is proportional to the data rate. The upper limit of the transmitted bits represents the carrying capacity of the common-mode data transmission channel. For example, at a 300 baud data rate, up to 75 bits may be transmitted in the 250 ms window.

In accordance with an alternative embodiment of the invention, the PD 14 may transmit data during a window defined by an overload time limit $T_{OVLD}$ established by the IEEE 802.3af standard, which specifies that if the output current $I_{Port}$ of a PSE exceeds an overload current detection range $I_{CUT}$ for longer than the overload time limit $T_{OVLD}$, the PSE should remove power from a Power Interface (PI). The minimum value of the overload time limit is 50 ms. During this time period, the PD 14 may transmit data by modulating the load current above or below $I_{CUT}$.

The PSE 12 may acknowledge receipt of the data from the PD by briefly dropping the line voltage to a level lower than the nominal 48V, and then restoring the voltage to its nominal level. Then, the PSE 12 may carry out the transmission of data to the PD 12 by alternately providing a line voltage at two distinct levels. Unlike the data transmission from the PD 14, where the number of transmitted bits is limited by the 250 ms window, the PSE 12 may transmit data for an indefinite period of time.

For example, after providing power to the PD 14, the PSE 12 may maintain a line voltage above the 44V minimum level required by the IEEE 802.3af standard. After receiving data transmitted from the PD 14, the PSE 12 may modulate the line voltage between 48V and 38V to represent a logic "1" and a logic "0" of data to be transmitted to the PD 14.

IEEE 802.3af-compliant PDs are required to stay operating until the line voltage is reduced to at least 37V to allow for voltage drop in the interconnection cable when the PD is drawing the maximum current. If during the data transmission from the PSE, the PD keeps its load current low, for example, at a 10 mA level, the voltage drop across the cable will be minimal compared to the voltage drop at the maximum 350 mA load current level. As a result, the 38V line voltage provided by the PSE to represent the logic "0" will remain above the 37V maximum turn-off voltage at the PD 14.

Therefore, the PD 14 must keep its load current at a low level during the data transmission from the PSE 12. If a PD draws a large amount of power in a normal operation (for example, in the case of a wireless access point that includes a high-power radio transmitter), it may need to delay turning on the majority of its circuitry until the data transmission is complete.

The common-mode data transmission protocol of the present invention may be used, for example, by a high-power PSE capable of providing higher power than the IEEE 802.3af standard requires. Using data transmission to a PSE, the PD may identify itself as a device requesting higher power than a regular PSE is required to provide. If the PSE receiving the PD data is a high-power PSE, it replies to the PD data by sending data acknowledging the request for higher power, and provides the power requested by the PD.

If a PD that uses the common-mode data transmission protocol is connected to a legacy PSE that does not understand the common-mode data transmission, the legacy PSE continues to provide power to the PD but does not respond to the data transmitted by the PD. In this case, the PD recognizes that the PSE does not support the common-mode data transmission protocol, and modifies its operation, if appropriate, to work with a legacy PSE.

Similarly, if a PSE that incorporates the common-mode data transmission circuitry applies power to a PD and does not receive any data from the PD, the PSE recognizes that the respective PD is a legacy PD, which does not support the common-mode data transmission protocol, and that the PD may immediately begin to draw full load current, which will disable the PSE transmission protocol. In this case, the PSE refrains from transmitting data to the PD. As long as the PSE does not lower the line voltage below the 44V minimum level, the PD is able to continue its normal operations.

Figure 5:
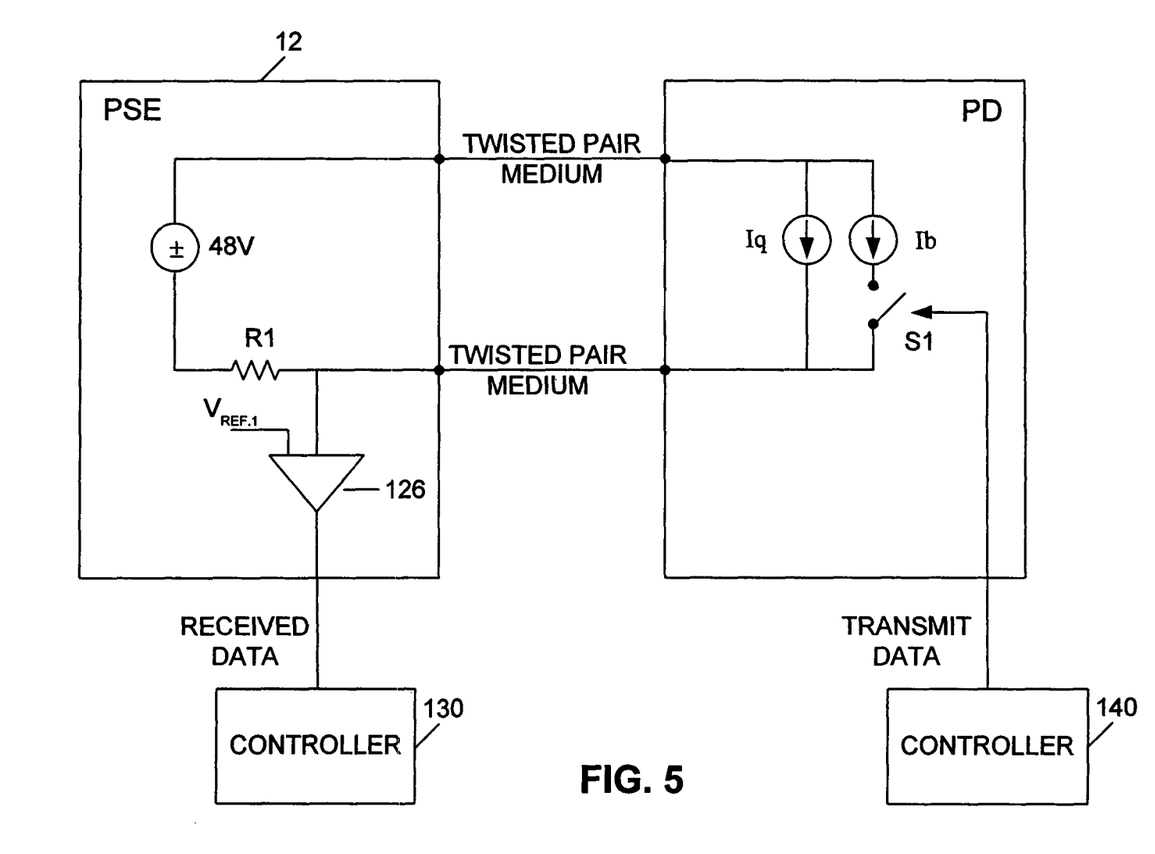
FIG. 5 illustrates data transmission from a PD to a PSE.
Figure 6:
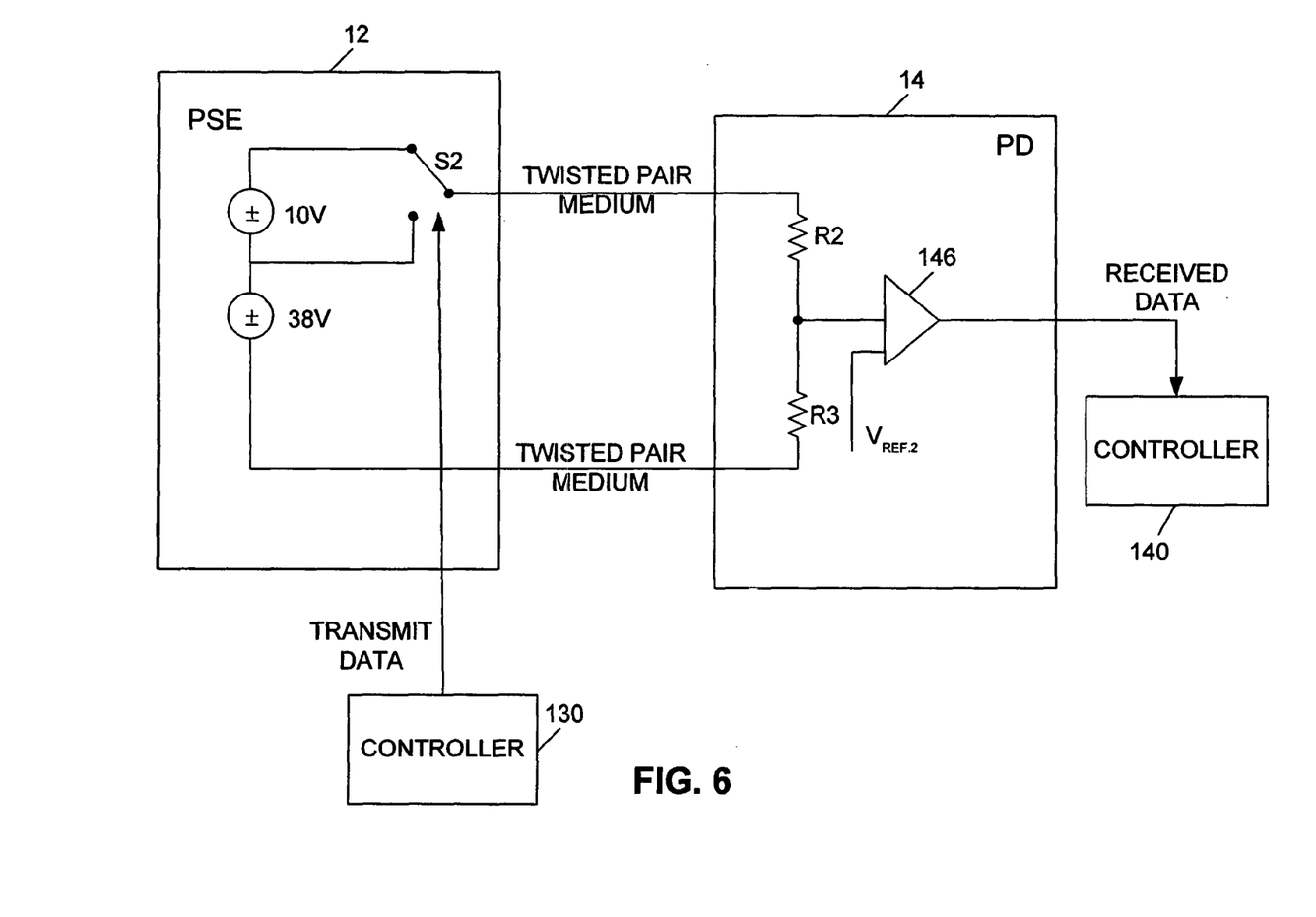
FIG. 6 illustrates data transmission from the PSE to the PD.

FIGS. 5 and 6 illustrate exemplary implementation of the common-mode data transmission system of the present disclosure. As shown in FIG. 5, when the PD 14 has to transmit data to the PSE 12, the transmit data supplied by a PD controller 140 controls the variable load 144 supplied by the 48V voltage provided by the PSE 12 to enable the operation of the variable load 144 in two modes. The controller 140 may be a data processing unit external or internal with respect to the PD 14.

For example, in response to a logic "0" in a data sequence to be transmitted to the PSE 12, the variable load 144 operates in a first operating mode, where its quiescent load current $I_q$ is maintained at a level less than 5 mA. In response to a logic "1" in the data sequence to be transmitted to the PSE 12, the variable load 144 is switched by a switch S1 into a second operating mode, where an additional load, for example, a resistor, is connected across the line, in order to draw an additional load current $I_b$ from the PSE 12. In the second operating mode, a total asserted load current $I_q+I_b$ may be at a level higher than 10 mA.

The PD load current detector 124 in the PSE 12 may comprise a resistor R1 and a comparator 126. The resistor R1 is arranged for converting the load current asserted by the PD 14 to a voltage representing the load current value. The voltage across the resistor R1 is compared by the comparator 126 with a reference voltage $V_{ref.1}$ to detect a logic level of the data received from the PD 14. The value of the reference voltage Vref.1 and resistor R1 are pre-selected to distinguish the logic levels of data received from the PD 14. For example, R1=0.5 Ohm, and $V_{ref.1}$=5 mV. The received data may be supplied to a PSE controller 130, which may be a data processing unit external or internal with respect to the PSE 12.

As shown in FIG. 6, when the PSE 12 transmits data to the PD 14, the PSE controller 130 supplying transmit data controls a switch S2 to switch the line voltage generator 122 between two operating modes. For example, in response to a logic "0" in the transmit data, the line voltage generator 122 operates in a first operating mode to produce a 38V line voltage. In response to a logic "1", the line voltage generator 122 is switched into a second operating mode, where an additional 10V voltage is connected to its output to produce a 48V line voltage.

The voltage detector 142 in the PD 14 may comprise a comparator 146, and a voltage divider composed of resistors R2 and R3 selected to divide the supplied line voltage by a predetermined value. The comparator 146 compares the voltage at the output of the voltage divider with a pre-determined reference voltage $V_{ref.2}$ to detect a logic level of data received from the PSE 12. The value of the reference voltage $V_{ref.1}$ and resistors R2 and R3 are pre-selected to distinguish the logic levels of the data received from the PSE 12. For example, R2=35 kOhm, R3=1 kOm and $V_{ref.2}$=1.2V. The received data may be supplied to the PD controller 140.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A Power over Ethernet (PoE) system, comprising:
a Power Sourcing Equipment (PSE) for providing power via a twisted pair link to a Powered Device (PD),
the PSE having data communication circuitry configured for providing data communication with the PD in a common mode between two pairs of lines in the twisted pair link so as to avoid interference with transmission of Ethernet data performed over the twisted pair link in a differential mode,
the data communication circuitry including current detecting circuitry for detecting values of current corresponding to data received from the PD, and voltage generating circuitry for producing voltage levels corresponding to data to be transmitted to the PD.

2. The system of claim 1, wherein the PD is configured for supporting data communication with the PSE.

3. The system of claim 2, wherein the PD is configured to initiate data communication with the PSE after the PD receives power from the PSE.

4. The system of claim 3, wherein the PD is configured to initiate data communication with the PSE during a low-current period defined by the IEEE 802.3af Standard.

5. The system of claim 2, wherein the PD is configured to initiate data communication with the PSE to identify itself.

6. The system of claim 2, wherein the PD is configured to transmit to the PSE data to determine whether the PSE is capable of providing power higher than an amount of power required by the IEEE 802.3af Standard.

7. The system of claim 6, wherein the PSE is configured to transmit to the PD data confirming ability to provide power higher than an amount of power required by the IEEE 802.3af Standard.

8. The system of claim 2, wherein the PD comprises a variable load for drawing from the PSE a first value of current in a first operating mode and a second value of current in a second operating mode, the first and second values of current correspond to respective logic levels of a data signal to be transmitted to the PSE.

9. The system of claim 8, wherein the PD further comprising a voltage detector for detecting first and second voltage levels corresponding to respective logic levels of a data signal transmitted from the PSE.

10. The system of claim 9, wherein the voltage detector includes a comparator for comparing a voltage level of a signal received from the PSE with a reference voltage to detect a logic level of the data signal transmitted from the PSE.

11. The system of claim 1, wherein the transmission of the Ethernet data is provided by an Ethernet system associated with the PoE system.

12. The system of claim 1, wherein the PSE further comprises a current to voltage converter for producing a voltage representing the value of current detected by the current detecting circuitry.

13. The system of claim 12, wherein the PSE further comprises a comparator for comparing the produced voltage with a reference voltage to determine a logic level of a data signal transmitted from the PD.

14. A method of data communication between a PD and a PSE in a Power over Ethernet system, the method comprising the steps of:
- receiving by the PD, power supplied from the PSE over a twisted pair link,
- after the PD receives the power from the PSE, initiating data transmission by the PD to transmit a data signal from the PD to the PSE in a common mode between two pairs of lines in the twisted pair link so as to avoid interference with transmission of Ethernet data performed over the twisted pair link in a differential mode, the data signal being defined by values of PD operating current drawn from the PSE, and
- detecting by the PD, voltage levels corresponding to data transmitted by the PSE.

15. The method of claim 14, wherein the data transmission is initiated during a low-current period defined by the IEEE 802.3af Standard.

16. The method of claim 14, wherein a duration of the data signal transmitted by the PD is limited by a 250 ms window defined by the IEEE 802.3af Standard.

17. A PD interface device for enabling a PD to support data communication with a PSE in a PoE system, the PD receiving power from the PSE over a twisted pair link, the PD interface device comprising:
- a variable load for transmitting a data signal having logic levels defined by values of PD operating current drawn from the PSE, the data signal being transmitted to the PSE over the twisted pair link in a common mode so as to avoid interference with transmission of Ethernet data performed over the twisted pair link in a differential mode, and
- a voltage detector for detecting line voltage levels corresponding to logic levels of data transmitted by the PSE.

18. A PSE device capable of supporting data communication with a PD in a PoE system, the PSE supplying power to the PD over a twisted pair link, the PSE device comprising:
- a current detector for detecting values of current drawn by the PD, the values of current correspond to logic levels of data received from the PD, and
- a voltage generator for producing first and second line voltage levels corresponding to respective logic levels of a data signal to be transmitted to the PD, the data signal being transmitted to the PD over the twisted pair link in a common mode so as to avoid interference with transmission of Ethernet data performed over the twisted pair link in a differential mode.

19. The device of claim 18 further comprising a current to voltage converter for producing a voltage representing the values of current detected by the current detector.

20. The device of claim 19 further comprising a comparator for comparing the produced voltage with a reference voltage to determine a logic level of the data received from the PD.

* * * * *